United States Patent
Wang

(12) 
(10) Patent No.: US 6,306,324 B1
(45) Date of Patent: Oct. 23, 2001

US006306324B1

(54) METHOD FOR MANUFACTURING PACKAGING MATERIAL AND SHEETS FROM PLANT STRAWS

(76) Inventor: Changrong Wang, No. 333 Xuefu Road, Harbin, Heilongjiang (CN)

( * ) Notice: Subject to any disclaimer, the term of this patent is extended or adjusted under 35 U.S.C. 154(b) by 0 days.

(21) Appl. No.: 09/309,230

(22) Filed: May 10, 1999

(30) Foreign Application Priority Data

May 25, 1998 (CN) ................................................ 98101970

(51) Int. Cl.⁷ .................................................... B29C 43/00
(52) U.S. Cl. ............................ 264/112; 264/109; 264/115
(58) Field of Search ..................................... 264/109, 122, 264/115, 112

(56) References Cited

U.S. PATENT DOCUMENTS 3,995,003 * 11/1976 Potter et al. ......................... 264/122

* cited by examiner

*Primary Examiner*—Mary Lynn Theisen
(74) *Attorney, Agent, or Firm*—Mills Law Firm PLLC

(57) ABSTRACT

A method for manufacturing packaging material and sheets, such as disposable food containers or seedling-breeding containers from straws, comprising pulverizing into powder, with 20–50 mesh; stirring the powder of straw, a binder, a lubricant and water in weight parts of 70–88, 0.3–1.0, 0.05–1 and 10–20 respectively, at ambient temperature for 5–15 minutes under 50–80 rpm to obtain a mixture, and thermal molding the mixture at a temperature of 100–150° C., and under a pressure of 20–250 MPa.

10 Claims, No Drawings

METHOD FOR MANUFACTURING PACKAGING MATERIAL AND SHEETS FROM PLANT STRAWS

BACKGROUND OF INVENTION

1. Field of Invention

The present invention relates to a method for manufacturing packaging material and sheets, particularly to a method for manufacturing disposable food and beverage containers and seedling-breeding containers by using plant straws.

2. Concise Explanation of Prior Art

CN 1130559 discloses a method for manufacturing disposable sanitary food containers by using straws, including pulverizing non-toxic straw into powder; mixing the powder with a binder, putting the mixture into a mold to produce a semi-product, and then coating the semi-product with a water-repellent agent on its surfaces, wherein, the weight ratios of straw powder, binder and water-repellent agent are 70–75%, 22–25% and 2–5% respectively. But in practice, it is found that it is not advantageous to use high percentage of binder because of high cost of binders and the difficulties of mold pressing and mold releasing which makes continuous and mass production nearly impossible.

BRIEF DESCRIPTION OF INVENTION

The object of the invention is to provide a low cost, continuous processing and steady method for manufacturing packaging materials and sheets using straws as raw material, particularly for manufacturing disposable food containers and seedling-breeding containers.

DETAILS OF THE INVENTION

The present invention provides a method including:

1. cutting straws into segments, drying until moisture content is less than 2% by weight, and pulverizing into powder with 20–50 mesh;
2. stirring the powder of straw, a binder, a lubricant and water in weight parts of 70–88, 0.3–1.0, 0.05–1 and 10–20 respectively, at ambient temperature for 5–15 minutes under 50–80 rpm to obtain a mixture;
3. thermal molding the mixture at a temperature of 100–180° C., and under a pressure of 20–250 Mpa;

The method can further comprise coating the surfaces of the molded product with a water-repellent agent in an amount of 1–7 weight part in the case of waterproofing being necessary.

Alternatively, 0.2 to 0.3 weight part of water-repellent agent can be directly incorporated into the aforementioned mixture.

In the aforementioned process, said straw can be any non-toxic plant straw, such as wheat straw, rice straw, or corn straw. The straw can be firstly cut into 1–2 cm segments, and then dried and pulverized.

In the aforementioned process, said binder can be selected from one of food binders or a combination of two or more food binders so as to be effective cooperatively. Or, polyvinyl alcohol, a mixture of poly (vinyl alcohol) and starch or modified starch can be used. Also, phenolic resin, urea-formaldehyde resin, melamine resin, polyvinyl acetate resin or sodium silicate can be used when manufacturing packaging containers or sheets.

Said lubricant used in the aforementioned process can be one or more selected from the group consisting of polyethylene wax, steratic acid and stearate, such as magnesium stearate, calcium stearate, zinc stearate and aluminum stearate; or soybean oil can be used as a lubricant.

Said water-repellant agent can be ethyl cellulose together with non-toxic solvent, such as ethyl alcohol; or non-toxic silicon water-repellent agent, such as organosilicon resin, or a combination of food binder (such as sodium carboxymethyl cellulose, sodium alginate, etc.), $CaCl_2$ and white alum in an amount of 1.5–2%, 3–5% and 1–2% respectively; or an aqueous solution of 2–4%, preferably 3%, poly(vinyl alcohol) and 0.5–1%, preferably 1%, melamine.

Other additives, such as reinforcing agent, can also be incorporated into the mixture to improve the intensity of the final product. Reinforcing agent can be one or more selected from the group consisting of sulfates, such as aluminum sulfate, ferric sulfate, zinc sulfate, anhydrous manganese sulfate and chromium sulfate. In the aforementioned method, the thermal molding can be operated under the pressure of 20–25 MPa when manufacturing food containers or seedling breeding container, or under the pressure of 200–250 MPa when manufacturing sheets, which mainly depends on the thickness of the final products.

The method may include further steps such as shaping so as to provide a package container, such as disposable food containers, seedling-breeding containers, or sheets.

The method can also comprise further steps such as decoloring the final product or printing the final product with presetting graphics.

The method according to the present invention can be operated continuously with high productivity. The final product can be degraded within several days which is non-toxic and can even be used as fertilizer or feeding stuff.

The present invention is now illustrated with reference to following examples.

EXAMPLE 1

Wheat straw was cut into 1 cm segments, dried under 120° C. for 1–2 minutes so as to reduce its moisture content less than 2% by weight, and then pulverized into 40 mesh powder.

860 kg of the dried straw powder, 9 kg of CMC Na, 0.5 kg of aluminum sulfate, 0.5 kg of calcium stearate and 120 kg water were stirred in a mixer under 60 rpm for 10 minutes to obtain a mixture.

The mixture was molded in a thermal mold under 120° C., 25 Mpa for 90 seconds to produce a bowl. The bowl has its upper diameter 152 mm, lower diameter 94 mm, height 60 mm, and its thickness 1.2 mm.

The bowl was spray-coated on its inner and outer surfaces sequentially by using an aqueous solution of 1% of sodium alginate, 3% of CaCl and 2% of white alum, and then dried at a temperature of 120° C.

EXAMPLE 2

Corn straw was cut into 1 cm segments, dried under 120° for 1–2 minutes so as to reduce its moisture content less than 2% by weight, and then pulverized into 30 mesh powder.

83.2 kg of the dried straw powder, 0.3 kg of poly (vinyl alcohol), 0.25 kg of Gu zinc stearate and 0.25 kg calcium stearate, 0.15 kg of zinc stearate and 0.25 kg calcium stearate, 0.15 kg of polyethylene wax and 15 kg water were stirred in a mixer under 60 rpm for 10 minutes to obtain a mixture.

The mixture was molded in a thermal mold under 150° C., 20 Mpa for 90 seconds to produce a two-body container. The first body has its size of 17 mm×124×45 mm and the second body has its size of 175 mm×124 mm×22 mm, its thickness 1.5 mm.

The container was dipped in ethyl alcohol solution of 3% ethyl cellulose and then dried at a temperature below 120° C.

EXAMPLE 3

Rice straw was cut into 1.5 cm segments, dried under 120° C. for 1–2 minutes so as to reduce its moisture content less than 2% by weight, and then pulverized into 50 mesh powder.

70 kg of the dried straw powder, 0.1 kg of poly (vinyl alcohol), 0.2 kg of phenolic resin, 0.5 kg calcium stearate, 15 kg water and 0.02 kg of food color were stirred in a mixer under 60 rpm for 10 minutes to obtain a mixture.

The mixture was molded in a thermal mold under 120–150° C., 230 Mpa for 90 seconds to produce a sheet (2 m×1 m×15 mm), then released from the mold.

No water-repellent agent was needed to coat the sheet. The final product could be used for making furniture, or making crates instead of cardboard boxes.

The final product was further printed on its surface.

EXAMPLE 4

Corn straw was cut into 1 cm segments, dried under 120° C. for 1–2 minutes so as to reduce its moisture content less than 2% by weight, and then pulverized into 30 mesh powder.

88 kg of the dried straw powder, 1 kg of phenolic resin, 0.25 kg of zinc stearate and 0.25 kg calcium stearate, 0.15 kg of polyethylene wax and 15 kg water were stirred in a mixer under 60 rpm for 10 minutes to obtain a mixture.

The mixer was molded in a thermal mold under 180° C., 25 Mpa for 90 seconds to produce a two-body container. The first body has its size of 175 mm×124 mm×45 mm and the second body has its size of 175 mm×124 mm×22 mm, its thickness 1.5 mm.

The container was dipped in an aqueous solution of 3% poly (vinyl alcohol) and of 0.5% melamine and then dried at a temperature below 120° C. The cost of the final product was lower than that of the product dipped by using water-repellent agent of ethyl cellulose.

EXAMPLE 5

Corn straw was cut into 1.5 cm segments, dried under 120° C. for 1–2 minutes so as to reduce its moisture content less than 2% by weight, and then pulverized into 20 mesh powder.

80 kg of the dried straw powder, 0.25 kg of poly (vinyl alcohol), 0.15 kg of sodium silicate, 0.1 kg of polyethylene wax and 16 kg water were stirred in a mixer under 60 rpm for 10 minutes to obtain a mixture.

The mixture was molded in a thermal mold under 150° C., 25 Mpa for 90 seconds to produce cylindrical seedling-breeding container with φ10 mm, 100 mm height and 1.5 mm thick. These seedling-breeding containers can be used instead of the seedling-breeding containers made from paper.

No water-repellent agent was needed to coat the container because waterproofing was not necessary.

EXAMPLE 6

Corn straw was cut into 1 cm segments, dried under 120° C. for 1–2 minutes so as to reduce its moisture content less than 2% by weight, and then pulverized into 30 mesh powder.

83.2 kg of the dried straw powder, 0.2–0.3 kg of ethyl cellulose as water-repellent agent, 0.3 kg of starch as binder, 0.5 kg of calcium stearate and zinc stearate, and 11 kg water were stirred in a mixer under 60 rpm for 10 minutes to obtain a mixture.

The mixture was molded in a thermal mold under 150° C., 25 Mpa for 90 seconds to produce square containers with an edge. The size of each container is of 175 mm×124 mm×22 mm, and its thickness is 1.2 to 1.5 mm for wall and bottom. The final product was obtained after de-molding.

What is claimed is:

1. A method of manufacturing packaging material and sheets, comprising the steps of:
   a. cutting plant straw into segments, drying said segments to a moisture content of less than 2% by weight, and then pulverizing said segments into a powder with 20–50 mesh;
   b. mixing said powder with a binder, a lubricant and water in weight parts of 70–88, 0.3–1.0, 0.05–1 and 10–20 respectively, at ambient temperature to obtain a mixture; and
   c. molding the mixture to form an article.

2. The method according to claim 1, further comprising the step of coating the surfaces of said article with a water-repellent agent in an amount of 1–7 parts by weight.

3. The method according to claim 2, wherein said water repellent agent is in an amount of 0.2–0.3 parts by weight.

4. The method according to claim 1, wherein said plant straw is any non-toxic plant straw selected from wheat straw, rice straw, corn straw or a mixture thereof.

5. The method according to claim 1, wherein said binder is selected from food binders, poly (vinyl alcohol), starch and modified starch, phenolic resin, urea-formaldehyde resin, melamine resin, polyvinyl acetate resin and sodium silicate or mixtures thereof.

6. The method according to claim 1, wherein said lubricant is selected from the group consisting of polyethylene wax, stearic acid, magnesium stearate, calcium stearate, zinc stearate, aluminum stearate, and soybean oil and mixtures thereof.

7. The method according to claim 2, wherein said water-repellent agent is selected from the group consisting of ethyl cellulose, organosilicon resin, or a combination of sodium carboxymethyl cellulose, sodium alginate, calcium chloride and white alum in an amount of 1–5-2% , 3–5% and 1–2% respectively; or a mixture of 3% poly(vinyl alcohol) and 1% melamine.

8. The method according to claim 1, wherein a reinforcing agent which is selected from the group consisting of aluminum sulfate, ferric sulfate, zinc sulfate, anhydrous manganese sulfate and chromium sulfate or a combination thereof is incorporated into the mixture.

9. The method according to claim 1, wherein the thermal molding is operated under the pressure of 20 to 150 Mpa.

10. The method according to claim 1, further comprising the step of decoloring the final product.

* * * * *